US007374095B2

(12) United States Patent
Blank et al.

(10) Patent No.: US 7,374,095 B2
(45) Date of Patent: May 20, 2008

(54) TRANSACTION CARD AND ENVELOPE ASSEMBLY

(75) Inventors: Eric Blank, Boston, MA (US); David A. Jacobs, Hopkinton, MA (US)

(73) Assignee: Arthur Blank & Company, Inc., Boston, MA (US)

( * ) Notice: Subject to any disclaimer, the term of this patent is extended or adjusted under 35 U.S.C. 154(b) by 128 days.

(21) Appl. No.: 11/185,288

(22) Filed: Jul. 20, 2005

(65) Prior Publication Data

US 2007/0017973 A1 Jan. 25, 2007

(51) Int. Cl.
*G06K 7/00* (2006.01)

(52) U.S. Cl. ...................... 235/486; 235/380; 235/487; 235/495

(58) Field of Classification Search ............. 40/120.01, 40/120; 235/486, 445, 495, 483; D19/9; 229/102.5, 92.8
See application file for complete search history.

(56) References Cited

U.S. PATENT DOCUMENTS

| | | | | |
|---|---|---|---|---|
| 3,737,648 | A | 6/1973 | Franc | |
| 4,506,823 | A | 3/1985 | Buchler | |
| 4,589,590 | A | 5/1986 | McGuire et al. | |
| 4,968,873 | A | 11/1990 | Dethloff et al. | |
| 5,001,853 | A | 3/1991 | Odien | |
| 5,213,214 | A | 5/1993 | Stringham | |
| 5,219,184 | A | 6/1993 | Wolf | |
| 5,226,532 | A | 7/1993 | Davidson et al. | |
| 5,392,983 | A | 2/1995 | Clarke-Bolling et al. | |
| 5,406,716 | A | 4/1995 | Rubinstein | |
| 5,477,040 | A | 12/1995 | Lalonde | |
| 5,495,644 | A | 3/1996 | Mesher et al. | |
| 5,629,977 | A | 5/1997 | Fonseca | |
| 5,641,115 | A | 6/1997 | Brewster | |
| 5,740,959 | A | 4/1998 | Savage | |
| 5,836,508 | A | 11/1998 | Savage | |
| 5,852,889 | A | 12/1998 | Rinaldi | |
| 5,884,770 | A | 3/1999 | Galm | |
| 6,088,943 | A | 7/2000 | Ramirez | |
| 6,439,613 | B2 * | 8/2002 | Klure | 283/62 |
| 6,493,970 | B1 * | 12/2002 | McCarthy et al. | 40/124.01 |
| 6,571,940 | B2 | 6/2003 | Newman | |
| 6,698,116 | B2 | 3/2004 | Waldron | |
| 6,732,459 | B1 | 5/2004 | Clark | |
| 6,877,263 | B2 | 4/2005 | Clark | |
| 2002/0100797 | A1 | 8/2002 | Hollingsworth et al. | |
| 2003/0150142 | A1 | 8/2003 | Street | |
| 2004/0093773 | A1 | 5/2004 | Clark | |
| 2004/0169087 | A1 | 9/2004 | Lasch et al. | |
| 2004/0187368 | A1 | 9/2004 | Foster | |
| 2004/0205138 | A1 | 10/2004 | Friedman et al. | |
| 2005/0065877 | A1 | 3/2005 | Cleary et al. | |

* cited by examiner

*Primary Examiner*—Seung Ho Lee
(74) *Attorney, Agent, or Firm*—Wolf, Greenfield & Sacks, P.C.

(57) ABSTRACT

A transaction card assembly and method for forming a transaction card assembly. The transaction card assembly may include one or more transaction cards that is separably attached to an envelope. The envelope may be fully formed and ready for use and attached at its outer surface to the transaction card assembly. The envelope pocket may be sized to accommodate all or a portion of the transaction card assembly, e.g., a single CR-80 size transaction card. The envelope may support the attached card, e.g., from hanger at a point-of-sale display. A message portion may be removably attached to the envelope and be arranged for placement in the envelope pocket.

44 Claims, 6 Drawing Sheets

TRANSACTION CARD AND ENVELOPE ASSEMBLY

BACKGROUND OF THE INVENTION

Transaction cards, such as credit and debit cards, gift cards, membership cards, telephone cards, promotional cards, e.g., frequent flyer cards, identification cards and the like, are widely used. Such transaction cards may include a variety of different indicia to identify the card, the individual using the card, a transaction account (such as a credit card account), and/or other features. The indicia may be represented in a string of alphanumeric characters, a bar code, an encoded magnetic strip, and/or a programmed electronic chip attached to the card (including electronic devices embedded in the card, RFID antennas, etc.).

SUMMARY OF THE INVENTION

In many cases, transaction cards are given as gifts, and a frequent problem involves obtaining a suitable envelope in which to give a card to a giftee. The suitability of the envelope may relate to many different features, including the envelope's size (e.g., a common letter sized envelope is typically too large to accommodate a gift card), color, printing or other markings on the envelope, or other features. Obtaining a suitable envelope can be made more problematic if gift cards sold by different issuers have different sizes and/or configurations since one envelope may fit one card, but not another. Some aspects of the invention relate to these types of problems, and in at least one embodiment, include an envelope removably attached to a corresponding transaction card so that a purchaser has ready access to an appropriate envelope that can be removed from the card, and the card placed in the envelope.

In one aspect of the invention, a transaction card and envelope assembly includes at least a first transaction card having a first machine readable feature, such as a magnetic strip, barcode, alphanumeric text, or an electronic chip, that is useable in a transaction involving the first transaction card. The first machine readable feature may include information representing a first account associated with the first transaction card, such as an account including funds useable when purchasing goods and/or services with the transaction card. An envelope, having a pocket and an outer surface that is exposed when the envelope is closed, may be attached at its outer surface to the transaction card. A user may detach the transaction card from the outer surface of the envelope and place at least a portion of the transaction card in the envelope pocket. In one embodiment, the envelope may be fully formed and ready for use without any folding or other manipulation by a user to prepare the envelope for use. This arrangement may make it easier for a user to obtain a suitably sized envelope when gifting a transaction card, particularly where the transaction card may have an unusual size and/or shape. Furthermore, the user need not be required to assemble an envelope from an unfolded or otherwise incompletely formed sheet of paper, enabling the user to provide a gift with an attractive envelope.

In another aspect of the invention, a transaction card and envelope assembly includes a transaction card assembly having at least one transaction card removably attached to a second portion, e.g., a hanger or advertising portion, or a second transaction card. The transaction card may have a first machine readable feature that is useable in a transaction involving the transaction card, e.g., including information representing a first account associated with the first transaction card. An envelope, having a pocket that is sized to be smaller than the transaction card assembly, may be removably attached to the transaction card assembly. A user may separate the transaction card from the second portion and the envelope, and place the transaction card alone into the envelope pocket. The second portion may be retained by the user, e.g., where the second portion is a reloader card for adding funds to an account associated with the transaction card. This arrangement may be useful where the giver does not wish to provide the entire transaction card assembly to the giftee and also wishes to give the card in a suitably sized envelope. In addition, in some embodiments, the smaller sized envelope can be concealed behind portions of the transaction card assembly, providing a more appealing product.

In another aspect of the invention, a transaction card and envelope assembly includes a transaction card assembly having at least one transaction card with a machine readable feature that is useable in a transaction involving the transaction card, e.g., the machine readable feature may include information representing an account associated with the transaction card. An envelope may be removably attached to the transaction card assembly, and a message portion, that may be arranged to receive handwriting and be removed from the envelope and placed in the envelope pocket, may be removably attached to the envelope. In one embodiment, the message portion may be directly connected to the envelope, e.g., at a perforated portion located near the opening to the envelope pocket. In another embodiment, the message portion may form part of the transaction card assembly, e.g., a break-off portion that may be separated from the transaction card for placement into the envelope pocket.

In one embodiment, the envelope may include a flap that is movable between an open position to expose the pocket for access and a closed position to close the pocket. The flap may include a hole that supports the envelope and attached transaction card from a hanger that engages with the hole. The flap may support the envelope and attached transaction card when in the open position.

In one aspect of the invention, the pocket of the envelope may be fully formed and ready for reception of a portion of the transaction card assembly without requiring folding or other construction of the envelope.

In one embodiment, the transaction card may be attached to the envelope so that its machine readable feature is accessible for reading at a point-of-sale for purposes of activating the first transaction card. For example, if the machine readable feature is formed on a side of the transaction card that is removably attached to the envelope, the card may be displaced relative to the envelope so that the machine readable feature is exposed for reading.

These and other aspects of the invention will be apparent and/or obvious in view of the following description.

BRIEF DESCRIPTION OF THE DRAWINGS

Illustrative embodiments of the invention are described below with reference to the following drawings, in which like numerals reference like elements, and wherein.

DETAILED DESCRIPTION

Figure 2:
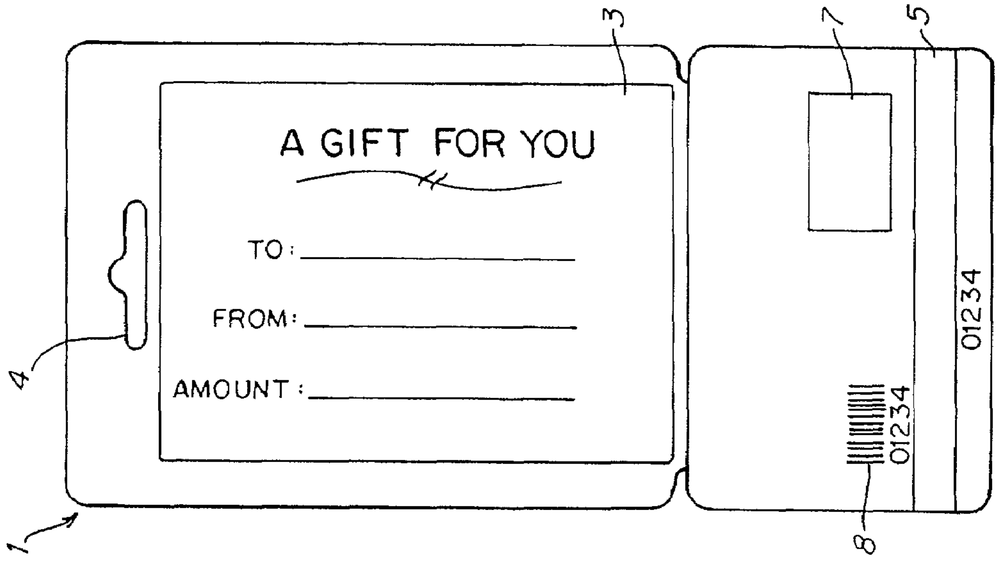
FIGS. 1 and 2 show front and back views of a transaction card assembly in accordance with an embodiment of the invention.

Aspects of the invention may be practiced using any suitable arrangement of transaction card assemblies and envelopes. Several different transaction card assembly embodiments are described for purposes of illustration herein. However, it should be understood that these illustrative embodiments of the invention should not be used to narrowly interpret the scope of the invention. For example, embodiments are described below in which an assembly includes one transaction card and one envelope, but aspects of the invention may include assemblies having two or more transaction cards and/or two or more envelopes. In addition, various aspects of the invention are described herein, and these various aspects may be used in any suitable combination.

As discussed above, transaction cards are widely used for a variety of different purposes, such as for credit and debit account purchases, tracking member activity (e.g., tracking frequent flyer activity), for gift-certificate purchases, and so on. Vendors issuing transaction cards for tracking member activity typically wish to ensure that users of an account receive transaction cards that are appropriately associated with the membership account. Vendors may also wish to provide advertising or other promotional information with a transaction card, e.g., to defer some of the cost of issuing the transaction card by having others pay for advertising included with the transaction card. As one example, a vendor may wish to issue a gift card or prepaid telephone card that entitles the bearer to a specified amount of purchase or telephone use credit. Advertising may be provided with the transaction card on a portion attached to the card or on an envelope to promote the vendor's service or other goods or services.

In one aspect of the invention, a transaction card and envelope assembly may include a transaction card, such as a gift card, prepaid telephone card or a prepaid credit card, having a first machine readable feature that is useable in a transaction involving the transaction card. The machine readable feature may be a barcode, magnetic strip, electronic chip, alphanumeric text, or other. An envelope may be removably attached to the transaction card at the envelope's outer surface, and may have a pocket arranged to receive at least a portion of the transaction card in the pocket. By securing the transaction card to the outer surface of the envelope, the envelope may be fully formed and ready to be used to enclose the transaction card without further construction of the envelope by a user, such as folding portions of the envelope, adhering one or more panels to another, or other steps needed to construct the envelope. Thus, a user may be able to purchase a gift card or prepaid telephone card with an envelope that is attached to the card and ready to be used to give the card as a gift. The user need only remove the card from the envelope, place the card in the pocket and close the envelope. The envelope may be preprinted with a gift or other message as well. In some embodiments, two or more envelopes may be attached to a transaction card so as to give a purchaser options as to which envelope to use, e.g., one envelope may be printed with a "happy birthday" message and another may be printed with a "happy graduation" message.

In another aspect of the invention, a transaction card assembly may have a transaction card and a second portion, such as an advertising portion, a hanging support portion and/or another transaction card, removably attached together. The transaction card assembly may be removably attached to an envelope that has a pocket that is smaller than the transaction card assembly. That is, the envelope pocket may be sized so that it can only fit a portion of the transaction card assembly (such as only the transaction card) in the pocket, or can only fit two or more portions of the transaction card assembly once the portions are separated from each other.

In another aspect of the invention, a transaction card and envelope assembly may include a transaction card and an envelope removably attached to the transaction card. A message portion may be removably attached to the envelope, with the message portion constructed and arranged to receive handwriting and be removed from the envelope and placed in the envelope pocket. For example, the envelope may be made to have an extra flap formed at the opening to the envelope pocket that forms a message portion. The extra flap may be printed with a message and/or be arranged to carry a handwritten message. The flap may be removed from the envelope, e.g., by tearing the message portion from the envelope at a perforation. The message portion may then be placed in the envelope with the transaction card. In another embodiment, the message portion may be attached to the transaction card. For example, the message portion and the transaction card may be made of the same sheet of material, and the message portion and the transaction card may be separated by breaking the card from the message portion at a score line or other line of weakness. The message portion and the transaction card may be placed in the envelope either while still attached to each other, or after separating the two.

Figure 1:
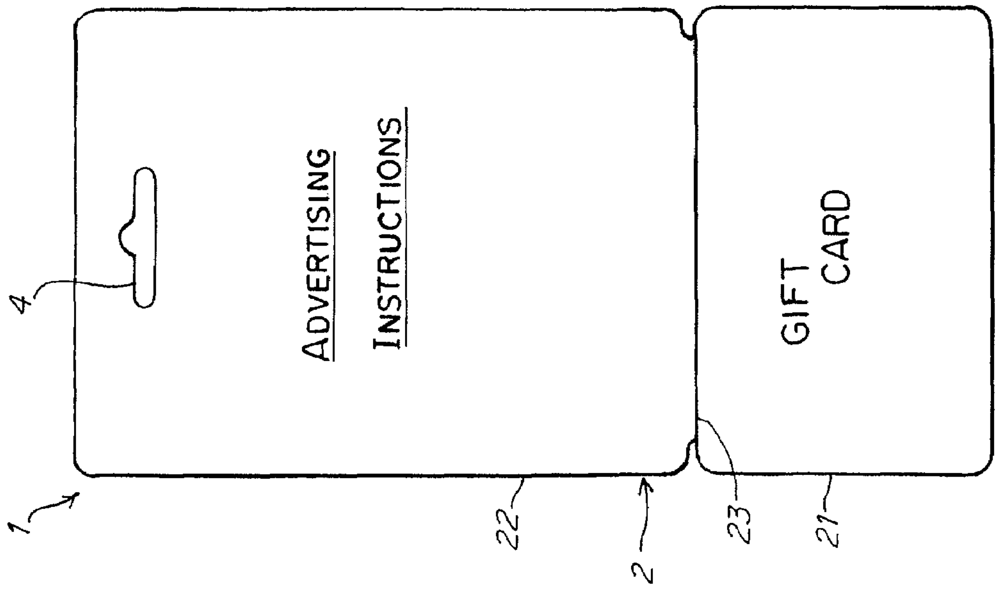

FIGS. 1 and 2 show front and back views, respectively, of an embodiment in accordance with aspects of the invention. The transaction card and envelope assembly 1 in this embodiment includes a transaction card assembly 2 having a transaction card portion 21 and a second portion 22 that may be made of a same sheet of material (e.g., a core material having a clear laminate on one or both sides of the sheet). The transaction card portion 21 and the second portion 22 may be separated from each other at a line of weakness 23, e.g., a score line formed on one or both sides of the sheet, a perforation, etc. Although in this embodiment the second portion 22 carries advertising, instructions or other printed material, the second portion 22 may be arranged in any suitable way, e.g., have two or more separable portions, may be or include a second transaction card, a coupon portion, etc. Also, the second portion 22 need not be made of the same sheet of material as the transaction card portion 21, but may be made separately and attached to the transaction card portion 21 in another way, e.g., made of a paper or cardboard material that is attached to the card portion 21. The second portion 22 (or the card portion 21 or the envelope 3) may include a hole 4 or other support feature (such as a hook, clip or other fastener) that may be used to hang or otherwise support the assembly 1, e.g., on a hook at a point-of-sale (POS). The hole 4 in this embodiment is shown in a "sombrero" form, but may be arranged in any suitable way.

Figure 3:
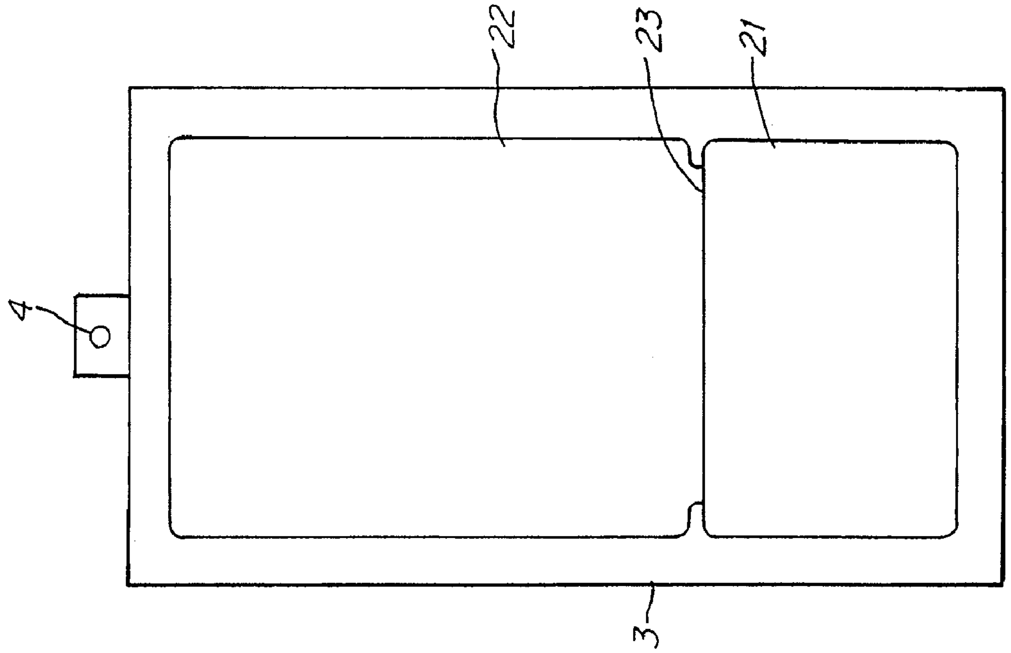

As can be seen in the back view of FIG. 2, an envelope 3 may be attached directly to the second portion 22 (and therefore be attached to the transaction card portion 21 as well). Of course, the envelope 3 may be attached in any suitable way to the transaction card assembly 1, such as by glue, a sticky adhesive, or other fastener, and may be attached directly to the transaction card portion 21 as well as, or instead of, the second portion 22. The envelope 3 may have a pocket (not shown) sized to receive only the transaction card portion 21, i.e., the pocket may be too small to receive the transaction card assembly 2 as a whole. Of course, the envelope 3 may be sized in any suitable way, such as be wider or longer than that shown in FIG. 2 and/or to receive the entire transaction card assembly 2, as shown for example in FIGS. 3 and 4. The envelope 3 may be sized to meet postal regulations, whether United States, or other international regulations. Alternately, the envelope may be sized to receive multiple parts of the transaction card assembly 2 once those parts have been separated from each other, e.g., to receive both the second portion 22 and the transaction card portion 21 once the two portions are separated from each other and placed in the envelope. The envelope 3 may include a message area printed on an outer surface and be arranged to receive handwriting or other printing. As a result, a user may purchase the transaction card and envelope assembly 1, separate the transaction card portion 21 from the second portion 22, place the transaction card portion 21 in the envelope 3 and give the envelope/transaction card to a giftee.

In accordance with one aspect of the invention, the envelope may be fully formed, i.e., require no assembly or other construction by a user to form the pocket of the envelope or otherwise make the envelope ready for receiving the transaction card and gifting. Also, by attaching the envelope 3 to the transaction card as shown in this embodiment, a purchaser may be able to readily obtain a suitably sized envelope to give the card as a gift, as many people prefer to give cards or other gifts in an envelope or other suitable covering. This feature may be useful where transaction cards are provided in different shapes and/or sizes, making it difficult to obtain a suitably sized envelope for the card if it were not attached to the card.

Figure 4:
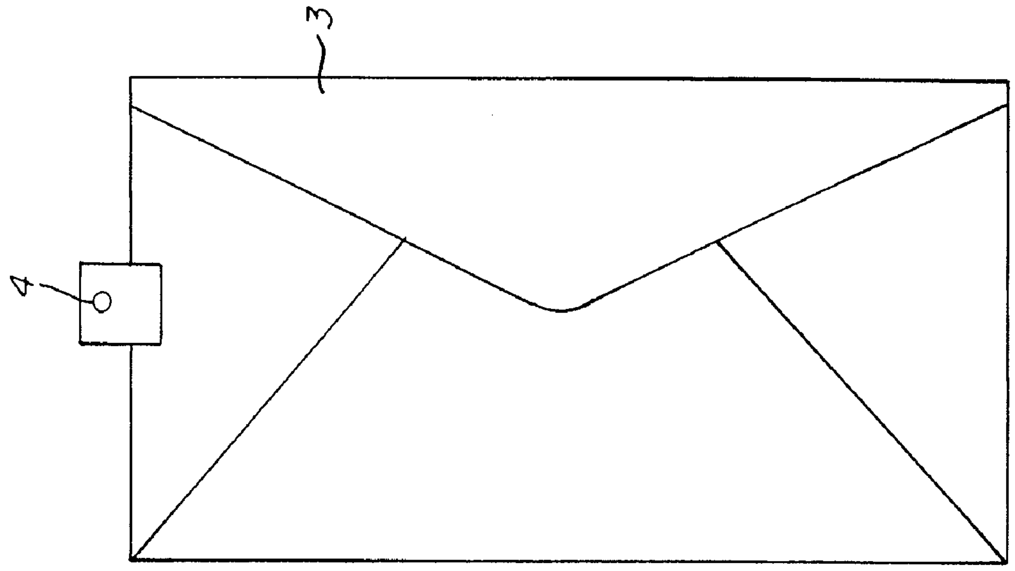
FIGS. 3 and 4 show front and back views of another transaction card assembly in accordance with an embodiment of the invention.
Figure 6:
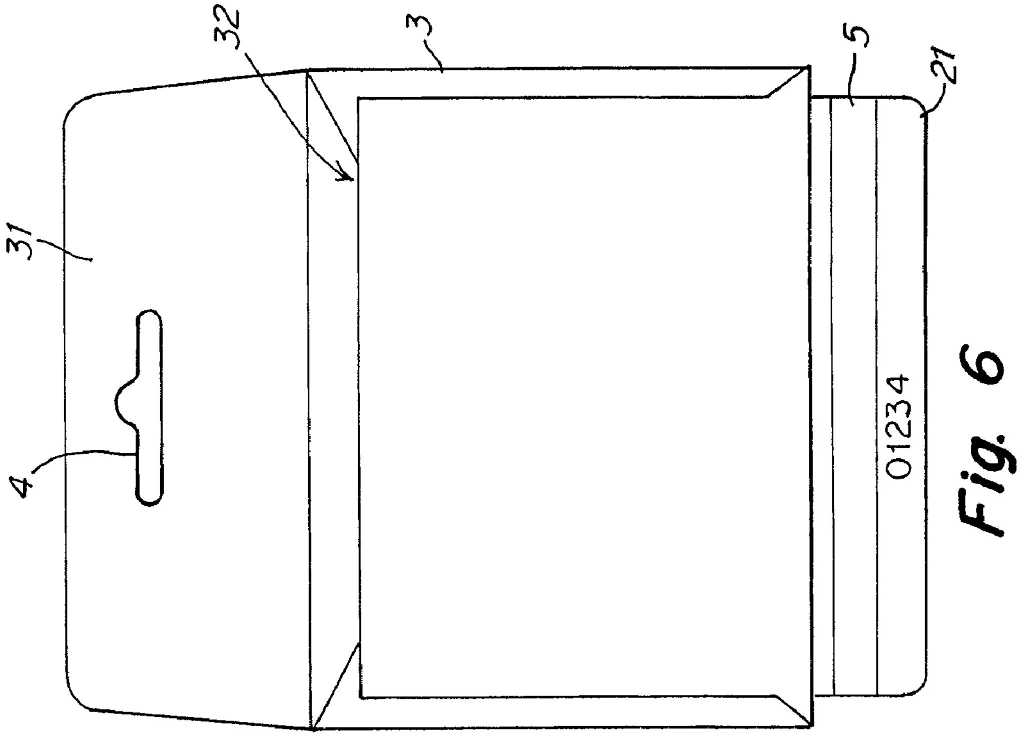
FIGS. 5 and 6 show front and back views of yet another transaction card assembly in accordance with an embodiment of the invention.
Figure 5:
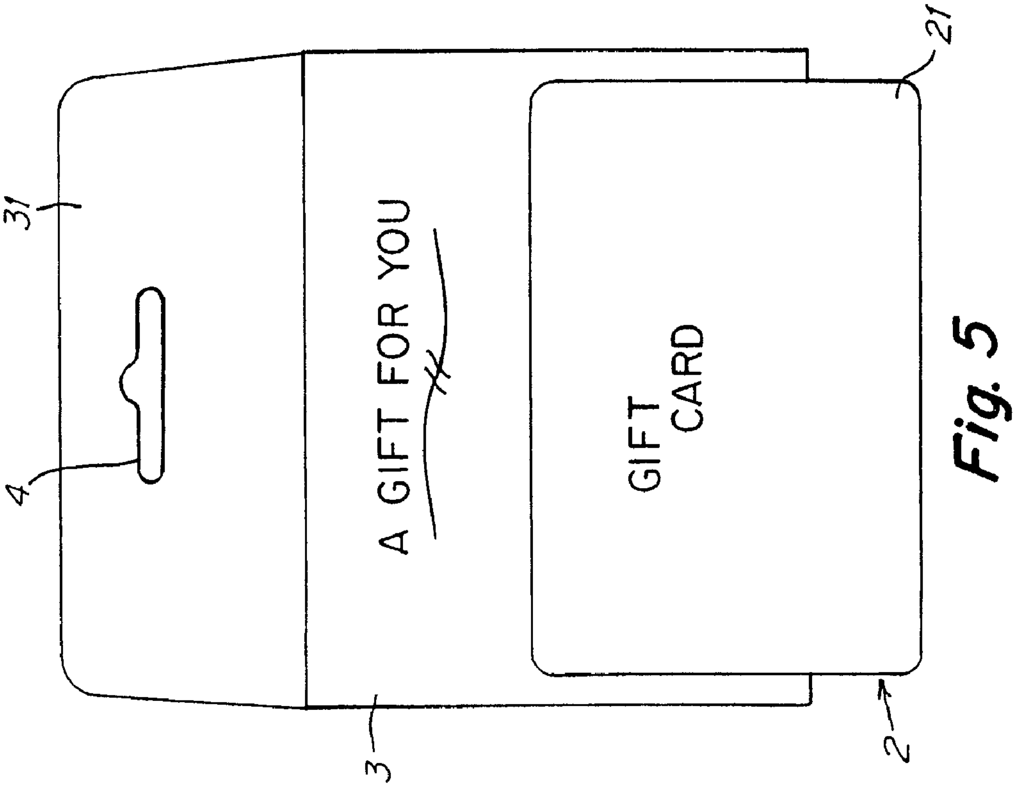

In another aspect of the invention, an envelope may be attached to a transaction card assembly so that the envelope may support the transaction card assembly. For example, FIGS. 5 and 6 show an embodiment in which a transaction card assembly 2 (in this embodiment including a single transaction card 21) that is attached to an envelope 3. The envelope 3 may include a hole 4 or other support feature (such as a hook, clip, adhesive, or other fastener) so that the envelope 3 may support the card 21, e.g., on a hook at a point-of-sale (POS) display. The support feature may also be formed integrally with the envelope, such by a portion extending from the envelope as shown in FIG. 4. In accordance with one aspect of the invention, the flap 31 of the envelope 3 may include the hole 4 or other support feature so that the flap 31 may support the envelope 3 and attached card 21. The flap 31 and/or other portion of the envelope 3 may include an adhesive, a tab/slot engagement or other feature so that the flap 31 may close an access to the pocket 32 of the envelope 3, e.g., to help prevent a card 21 placed in the pocket 32 from falling out.

In accordance with another aspect of the invention, the transaction card may be attached to the envelope so that a machine readable feature on the card may be accessed, e.g., for purposes of activating the card at the time of purchase. In one aspect of the invention, the card may be attached to the envelope on the same side of the card that the machine readable feature is formed on, yet be attached so that the machine readable feature is accessible. The machine readable feature may take any form, such as alphanumeric text, an encoded magnetic strip 5, a barcode 8, an electronic chip or other device. As is well understood in the art, the machine readable feature may include indicia that represents a number or other information relating to an account associated with the card that may be debited/credited when the card is used to purchase goods/services or in other transactions. In the FIGS. 5 and 6 embodiment, the card 21 is attached to the envelope 3 so that the magnetic strip 5 is exposed (or exposable, e.g., by folding back part of the second portion 22 or the envelope 3 to expose the magnetic strip 5) and available for "swipe" reading. Of course, it should be understood that the card 21 may be attached to the envelope 3 in other ways so that the machine readable feature is accessible, such as by attaching the card to the envelope by a hinge connection, attaching the card to the envelope on a side opposite that on which the machine readable feature is formed, and so on.

Figure 8:
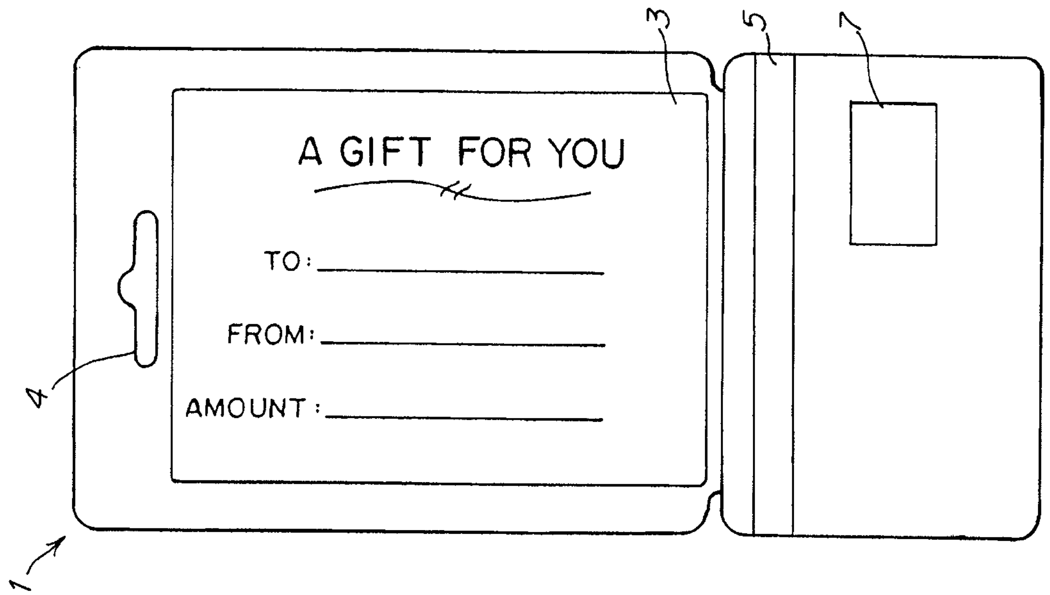
FIGS. 7 and 8 show front and back views of another transaction card assembly similar to that of FIGS. 1 and 2 in accordance with an embodiment of the invention.
Figure 7:
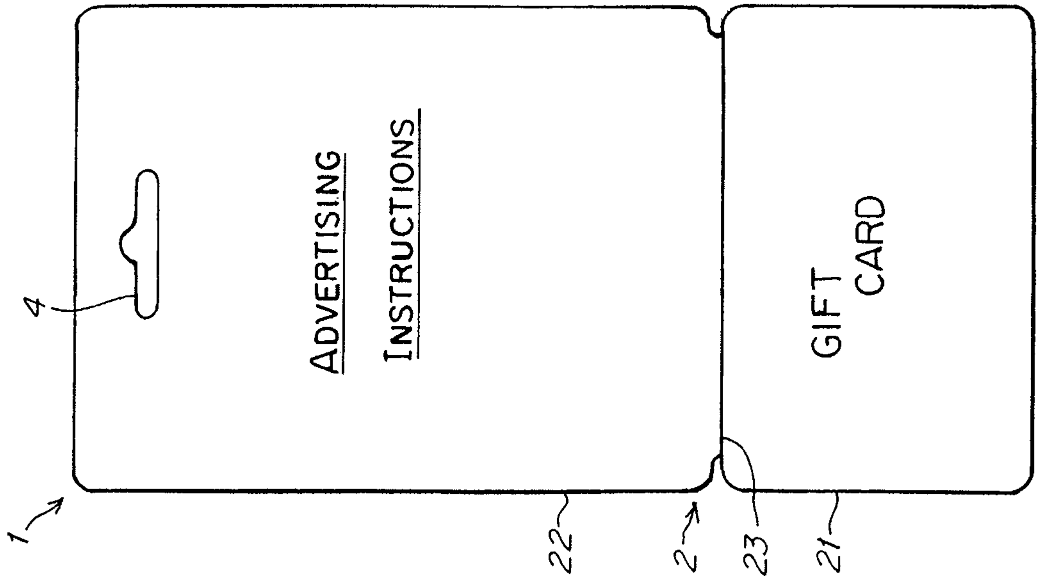

In another embodiment, the machine readable feature may be arranged in the assembly 1 so that the transaction card 21 must be removed from the assembly 1, or other manipulation of the assembly 1 is required to allow access to the machine readable feature for purposes of activating the card. For example, FIGS. 7 and 8 show an embodiment that is similar to that of FIGS. 1 and 2, except that the magnetic strip 5 is positioned in such a way, e.g., near the line of weakness 23 and the second portion 22, so that the magnetic strip 5 cannot be read by a standard magnetic strip reader without being first removed from the second portion 22. Other arrangements are possible, such as a label or other structure that removably covers a machine readable feature, and others.

Figure 10:
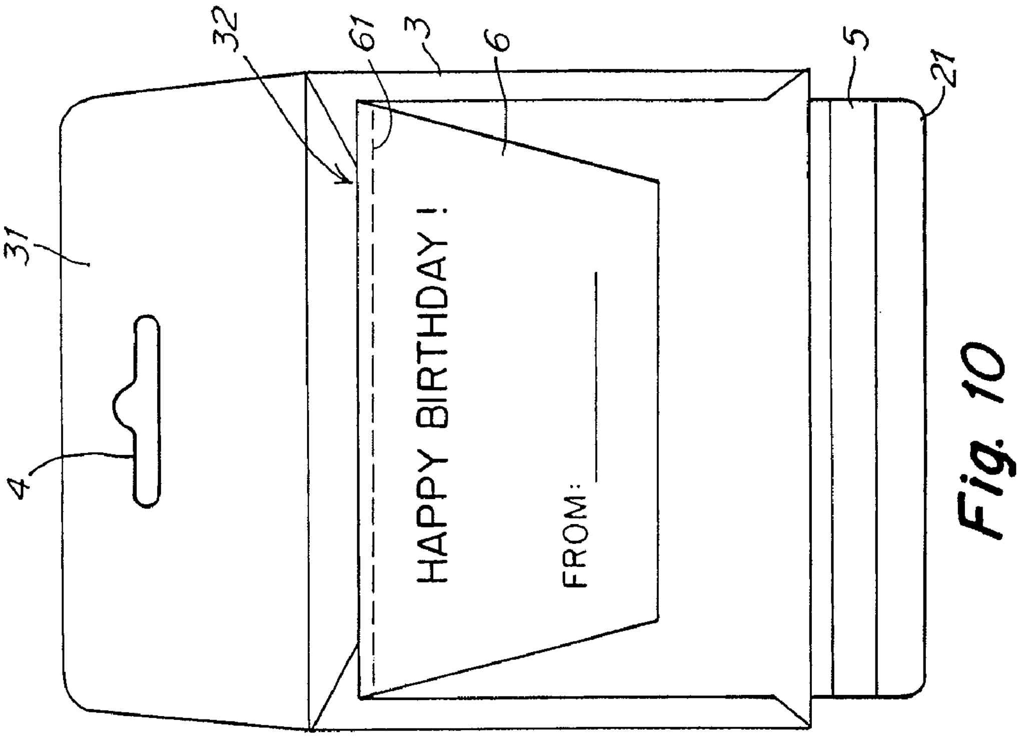
FIGS. 9 and 10 show front and back views of another transaction card assembly in accordance with an embodiment of the invention.
Figure 9:
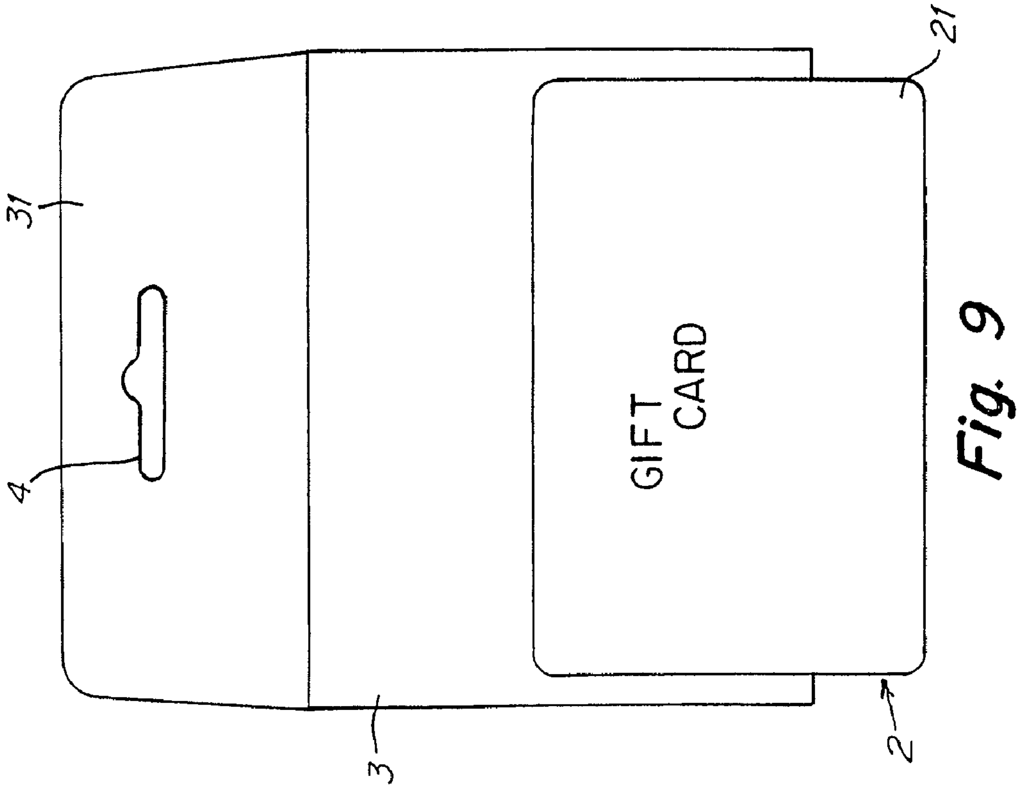
Figure 12:
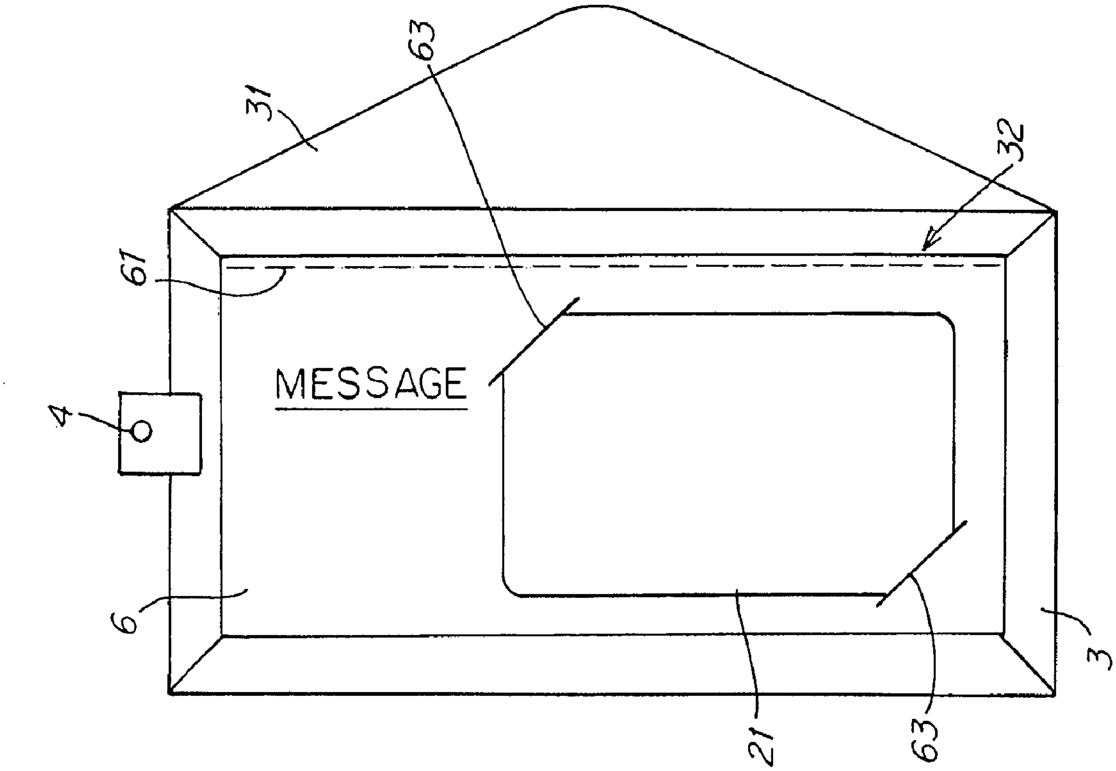
FIGS. 11 and 12 show front and back views of another transaction card assembly similar to that of FIGS. 3 and 4 in accordance with an embodiment of the invention.
Figure 11:
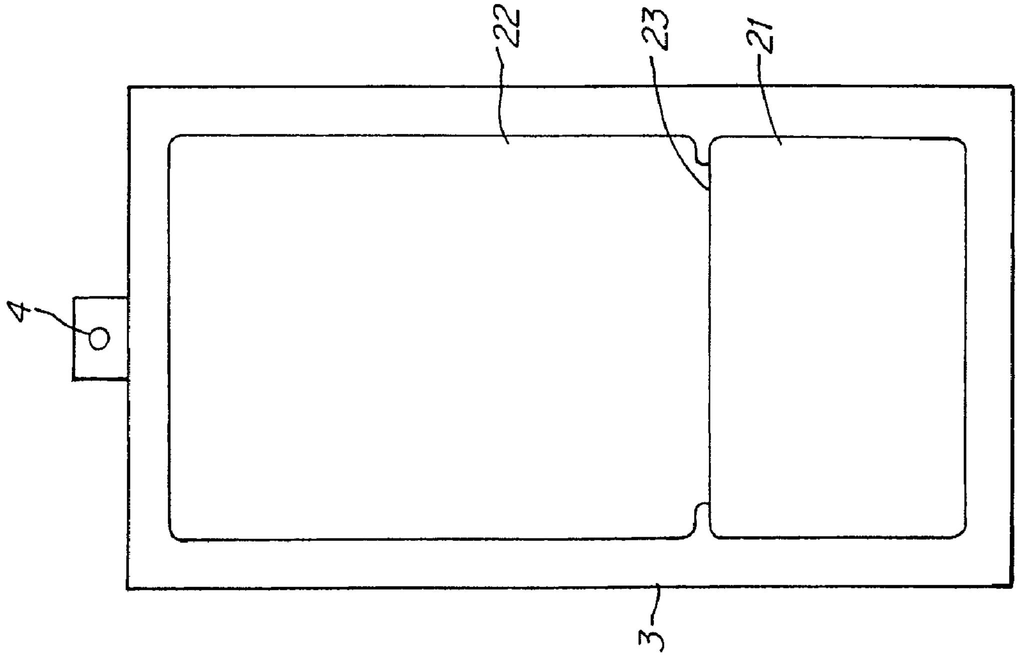

In another aspect of the invention, a message portion may be removably attached to the envelope and transaction card. The message portion may be arranged to receive handwriting and/or may include pre-printed text, graphics or other information, such as that found in a conventional greeting card. The message portion may be arranged to be removed from the envelope/transaction card and be placed in the envelope pocket along with the transaction card. FIGS. 9 and 10 show one embodiment that is similar in many respect to that of FIGS. 5 and 6, except that a message portion 6 is removably attached to the envelope 3 at a location near the opening to the pocket 32. FIGS. 11 and 12 show another embodiment in which a message portion 6 is provided as a tear-off portion from the envelope 3. In this embodiment, the message portion 6 includes a pair of slits 63 that allow a user to removably engage the card portion 21 with the message portion 6 and place them together in the pocket 32 of the envelope 3. The card portion 21 may be engaged with the message portion 6 in other ways, such as a sticky adhesive, a pocket formed on the message portion 6, a clip, or other arrangement.

In these embodiments, the message portion 6 is removable from the envelope 3 via a perforation 61, but the message portion 6 may be attached to the envelope 3 in other ways, such as by a sticky adhesive, mechanical fastener, etc. In another embodiment, the message portion 6 may be arranged as part of the transaction card assembly, e.g., the second portion 22 attached to a transaction card portion 21. That is, the transaction card assembly 2 may include the transaction card portion 21 and a second portion 22 that is formed (at least in part) to function as a message portion 6. As in the embodiments in FIGS. 1-2 and 3-4, the message portion 6 (formed by the second portion 22) may be made of the same sheet of material as the transaction card portion 21 and may be separated (or not) from the transaction card portion 21 before being placed in the envelope pocket 32. Alternately, the message portion 6 may be formed in other ways and attached to the transaction card portion 21.

The transaction card assembly 2 in the above embodiments may include one or more credit or debit cards, a membership identification card, an account identification card, a gift card, a prepaid telephone card, and so on. The portions of the assembly 2 may include any printed or otherwise presented material, such as advertising, a logo, issuer name, hologram, handwritten information, a coupon or other purchase rebate information, and so on. Such information may be carried on either or both sides of each card. Thus, text or graphics information may be printed directly onto, physically stamped into, adhered to, or otherwise placed, e.g., by a label 7 (see FIG. 2), on the transaction card portion, the second portion, or other portion of the transaction card assembly. The assembly 2 may be formed, in whole or in part, of any suitable material, such as a plastic or paper sheet material, e.g., with the second portion 22 formed of paper and the card portion 21 formed of plastic. If a transaction card of the assembly 1 is intended to meet ANSI and ISO specifications; the card may be made from a sheet of suitable material, e.g., poly vinyl chloride (PVC) or other material (e.g., PET, PETG, ABS or other plastic and/or synthetic materials) having a thickness of 0.030 inches±ten percent. However, ANSI and ISO specifications for transaction cards typically change over time, and therefore the card may be made of any suitable material, have any suitable dimensions or have any other feature to meet with desired ANSI and ISO specifications for transaction cards.

In one illustrative embodiment, the transaction card assembly may be stamped or die cut from a single sheet of plastic material. A line of weakness between portions of the assembly (if present) may include perforations, scoring, or other features. Using the line of weakness, the portions of the transaction card assembly may be separated from each other by folding one portion toward the other along the line of weakness, or by tearing along the line of weakness. The line of weakness may be formed to allow separation of the portions so that the edge(s) where the portions were connected have a smooth edge after separation, e.g., so that one or both portions meet ANSI and ISO specifications for edge roughness. For example, in the case of transaction cards formed from a single sheet of PVC material having a clear plastic overlaminate on both sides, the line of weakness may be formed by a scoring on both sides of the sheet. Scoring on both sides of the sheet may be done simultaneously with cutting of the assembly 2 from the sheet so as to ensure proper registration of the scoring with the card shape. The line of weakness is not a required feature, since the portions of the transaction card assembly may be separated, if desired, by cutting the portions apart, e.g., using a scissor, shear or other suitable device or method.

In an alternative embodiment, the portions of the transaction card assembly (if there are more than one) may be formed separately, and/or may be formed of different materials. The portions may then be brought together in an edge-to-edge relationship and connected together, e.g., along mating edges positioned similar to that shown for the line of weakness 23 in FIG. 1. The portions may be joined together at the edges by any suitable means, such as thermal welding, an adhesive, a mechanical fastener, a coupling device (e.g., a coupling having opposed channels into which the edges of the portions are inserted and held by the channels) and so on.

Alternately, the portions of the transaction card assembly 2 need not be joined in an edge-to-edge relationship. Instead, for example, the transaction card portion 21 may overlap a portion of the second portion 22 and be joined at the overlap. In another embodiment, the transaction card portion may be made separately and attached to a carrier, such as a sheet of cardboard or other material. The card may be connected to the carrier by glue, mechanical fasteners, or any other suitable means, and the envelope may be attached to the carrier (second portion 22) and/or the card portion 21. The transaction card portion may be arranged so that information or other features on the cards are obscured from view until the transaction card is separated from the second portion and/or the envelope. For example, the transaction card portion 21 may be a prepaid phone card having a personal identification number (PIN) or other character sequence that is used to obtain prepaid telephone services. The transaction card portion may be attached to the second portion or the envelope so that the PIN or other sequence is obscured from view (at least without detection) until after the phone card is activated at the time of purchase.

In the illustrative embodiment shown in FIGS. 1 and 2, the transaction card portion 21 and the second portion 22 are attached along a long edge of the transaction card portion. Both portions in this embodiment have an approximately rectangular shape, but it should be understood that the portions may be connected at any one (or more) of their edges, or a combination of edges, if desired. Also, the portions may have any suitable shape, such as any polygon, circle, oval, and so on, rather than a rectangular shape as shown. Further, the transaction card assembly may have several different, separable portions, not just two as shown. For example, a transaction card assembly may include one or more transaction card portions (e.g., a CR-80, keytag or other device), one or more advertising portions, one or more coupon portions, etc.

In an embodiment in which a transaction card assembly may include two or more transaction cards that are connected together, the transaction cards may have the same or different size and/or shape, and may each be associated with the same or different issuers, i.e., a store, retailer, vendor, service provider or other entity that provides products and/or services (including purchasing services provided by a credit card issuer) in connection with the transaction card(s). Thus, each transaction card may be associated with the same or a different account when entering purchasing goods and/or services with the transaction card.

For example, a transaction card assembly may include a first gift card issued by a restaurant chain and a second gift card issued by a movie theater. The first card may be useable only with the first issuer (i.e., only at restaurants that are part of the issuer restaurant chain), and the second card may be useable only with the second issuer (i.e., only at the issuing movie theater). A customer may purchase the transaction card assembly, have both cards activated, and then give the transaction card assembly as a gift to a friend, i.e., a gift of a dinner and movie. The user may keep the cards connected until putting them to use, i.e., separating the cards before using them to purchase a meal and movie tickets, respectively.

In another embodiment, a transaction card assembly may include a first gift card issued by a retailer, and a second pre-paid telephone card issued by a long distance telephone service provider. The first gift card may be useable only at the retailer's stores. The second card may be useable to obtain long distance calling services. The transaction card assembly may make a suitable gift to a new college student, e.g., by allowing the student to make needed purchases when starting school and providing an easy way to make long distance calls.

In another embodiment, a transaction card assembly may include a first gift card issued by a retailer, and a second gift card/reloader card that may be used to make purchases and/or add funds to the account associated with the first gift card. Thus, a user may give the first card as a gift to another, and then use the second card to add funds to the first card's account as desired.

In another aspect of the invention, all of the accounts associated with the transaction cards in an assembly, i.e., two or more cards, may be activated by reading information from one of the transaction cards and activating all of the transaction card accounts based on the information on one of the transaction cards. For example, a transaction card assembly may include two or more connected gift cards. The accounts associated with each gift card may be activated by reading an account number from one of the cards, and transmitting the number to an appropriate entity that causes both the account associated with the transmitted account number and the account for the other gift card to be activated. A suitable number of envelopes may be attached to the assembly (e.g., a number equal to the number of transaction cards) so the cards may be given separately to different people.

Activation of all accounts for all cards in a transaction assembly can be made possible by keeping track of the account numbers or other information for the transaction cards in each assembly at the time of manufacture. For example, where a plurality of transaction assemblies are produced each having two or more gift cards, a database may be built including the association of all indicia for each gift card in each assembly. Thus, the database may include a record for each transaction card assembly that indicates an account number or other indicia for a first gift card in the assembly and an account number or other indicia for the second gift card in the assembly. When the transaction card assembly is purchased, the indicia from one of the gift cards may be read and sent to the entity responsible for activating the gift cards. The database may be accessed to determine the account number or other indicia of the unread gift card, and both accounts may be activated as appropriate.

Such an arrangement may be useful when one of the cards includes indicia that is not easily read at the time of activation. For example, in transaction card assemblies that have a gift card with a readable magnetic strip and a pre-paid telephone card having printed alphanumeric text obscured by a scratch-off label, the indicia on the telephone card (the printed text) may be difficult or impossible to read without removing scratch-off label. However, in accordance with one aspect of the invention, the telephone card may be activated by reading indicia in the gift card's magnetic strip, looking up the telephone card indicia that corresponds to the gift card, and activating both accounts.

The portions of the transaction card assembly may each include one or more machine readable features either of the same type or of different types, e.g., two magnetic strips, a magnetic strip on one portion and a barcode on the other portion, etc. Further, the machine readable features, like any other information may be placed on any suitable side or location of the portions. In the example shown in FIGS. 1 and 2, the transaction card portion 21 may include a machine readable feature in the form of a magnetic strip 5 and/or a barcode 8. The magnetic strip 5 and/or barcode 8 may be encoded with suitable information as is common with gift cards, credit cards, debit cards and automatic teller machine (ATM) cards. The magnetic strip 5 may be heat laminated to the first transaction card portion, e.g., in a way to meet current or future ANSI and ISO standards, or may be transferrable to the card, and may be formed anywhere on the transaction card. For example, the magnetic strip 5 may be fixed to the transaction card portion by an adhesive and/or arranged over the entire back surface of the card (e.g., a full magnetic back). Magnetic strips may be formed on the same side of portions of the assembly 2, the magnetic strips 5 may be formed on opposite sides, the front only, the back only, etc. Use of a magnetic strip 5 that meets ANSI and ISO specifications may be required for specific applications, such as credit card applications where the magnetic strip 5 may be repeatedly read over its lifetime. However, the magnetic strip 5 may be fixed to the transaction card portion in a less robust way for less demanding applications, such as where the magnetic strip 5 may be read only once or twice over its lifetime. Although only one magnetic strip is shown extending along one long edge of the transaction card portion, magnetic strips may be located in any other suitable position, e.g., extend horizontally, vertically, on a bias, between the long edges of the transaction card portion, on the second portion, and so on. The machine readable features may be used to store, obtain, transmit or otherwise handle any type of information, such as text, biometrics information (such as eyescan or fingerprint information) and so on.

As is shown in FIG. 2, one or more labels 7 may be attached to the assembly 2, e.g., to the transaction card portion 21 and/or the second portion 22. A label 7 may be attached so that the label 7 is removable and reusable, e.g., can be removed and adhered again to the transaction card and/or the second portion or to another surface (such as a registration form), so that the label 7 is removable but cannot be reattached to any surface (such as when covering a PIN), or so that the label 7 is not removable (without damaging the label 7 as in a scratch-off label). The label 7 may include any information, e.g., that is printed on the label 7. The label 7 may include a machine readable feature, such as a barcode, that includes indicia that matches indicia included in a machine readable feature elsewhere on the transaction card assembly 2.

Indicia included in a magnetic strip 5, label 7, barcode 8, printed text or other machine readable feature on the assembly 2 may be unique with respect to the respective transaction card in a set of transaction card assemblies. For example, each transaction card assembly may include a card with indicia, such as an account number, biometric information or other, that is unique to that transaction card. A plurality of transaction card assemblies each having unique indicia on the cards may be included in a set of assemblies that are used, for example, as part of a gift card system. This indicia may be used activate the transaction cards at the time of purchase or other suitable time. If the indicia on a label 7 on the assembly matches indicia in another machine readable feature on the first transaction card portion 21 (such as indicia encoded in a magnetic strip 5), the label 7 may be removed from the assembly when the assembly is placed into service. For example, as part of an issuee registration procedure, an issuee may complete a registration form including the issuee's name, address and other suitable information and place the label 7 containing the unique indicia on the registration form. Thus, the issuee and issuer of first transaction card portion may be more easily assured that the proper indicia, such as an account number included on the label 7 and in the magnetic strip 5 is included in the registration form. This can ensure that the proper issuee information is associated with the account number included in the transaction card and allow the associated account to be activated.

In another aspect of the invention, a transaction card assembly 2 may include two or more cards that are related to a same account. However, while one of the cards may have a full range of privileges with respect to the account, such as allowing the card holder to deposit funds into the account, withdraw an unlimited amount of funds, etc., another of the cards may have a limited set of privileges associated with it, such as permission to withdraw/spend a maximum fund amount each month. For example, the first transaction card portion may have full privileges with respect to an account, such as a bank account, gift card account, credit card account, etc. The holder of the first transaction card may use the card to purchase goods and/or services (at only one issuer of the assembly or a plurality of entities), provide funds into an account associated with the card (e.g., to recharge a gift card or pre-paid credit card, etc.), to check an account balance, adjust the privileges of other cards related to the account, etc. The holder of a second transaction card may have a more limited set of privileges, such as the ability to withdraw or otherwise use a limited amount of funds in an account shared with the first transaction card over a given time period. For example, the holder of the second transaction card may be limited to withdrawal or other use of only $50 per month. The shared account may have funds directed into it from any suitable source, such as an employer of the holder of the first transaction card who deposits the holders pay (or a portion of the pay) into the account at the end of each pay period. Of course, the transaction card assembly 2 may include other cards that have any suitable set of permissions with respect to the account.

The use of transaction cards to obtain goods/services is well known to those of skill in the art. For example, an account number, biometrics or other indicia encoded in a magnetic strip, barcode, printed alphanumeric text, or electronic device, such as a chip, antenna, etc., can be read by the good/service provider at the time of purchase and an account associated with the card debited appropriately. In some cases, account information may be maintained in a computer system of the good/service provider or a third party (e.g., like that in the case of credit cards), and may be adjusted accordingly, e.g., have a dollar amount debited to the account consistent with the value of the goods/services obtained. In other embodiments, account information in the card itself may be adjusted. For example, so-called smart-cards or other cards with an electronic chip or other device may include account information stored in memory that is adjusted when goods/services are obtained with the card. As will be understood, communications with the chip or other device, and the information stored in the chip, may be suitably encrypted or otherwise protected from tampering or other unauthorized access/modification.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A transaction card and envelope assembly comprising:

at least a first transaction card having a first machine readable feature that is useable in a transaction involving the first transaction card, the first machine readable feature including information representing a first account associated with the first transaction card; and an envelope having a pocket and an outer surface that is exposed when the envelope is closed, the envelope being constructed and arranged to receive at least a portion of the first transaction card in the pocket and to be closed with the portion of the first transaction card in the pocket;

wherein the first transaction card is removably attached to the outer surface of the envelope to allow a user to remove at least a portion of the first transaction card from the outer surface of the envelope and place the portion of the first transaction card in the pocket.

2. The assembly of claim 1, wherein the envelope includes a flap that is movable between an open position to expose the pocket for access and a closed position to close the pocket.

3. The assembly of claim 2, wherein the flap includes a hole and is constructed and arranged to support the envelope and attached at least first transaction card from a hanger that engages with the hole.

4. The assembly of claim 3, wherein the flap is constructed and arranged to support the envelope and attached at least first transaction card in the open position.

5. The assembly of claim 1, wherein the pocket of the envelope is fully formed and ready for reception of a portion of the first transaction card without requiring folding or other formation of the envelope.

6. The assembly of claim 1, wherein the envelope is constructed and arranged to support the attached at least first transaction card from a hanger that engages with the envelope.

7. The assembly of claim 6, wherein the envelope includes a hole that is constructed and arranged to engage with the hanger.

8. The assembly of claim 1, comprising the first transaction card and a second portion removably attached to the first transaction card.

9. The assembly of claim 8, wherein the first transaction card and the second portion are formed from a same sheet of material and are separable via a line of weakness formed in the sheet of material.

10. The assembly of claim 8, wherein the pocket has a size that is suitable to receive the first transaction card alone, but is too small to receive the first transaction card when attached to the second portion.

11. The assembly of claim 10, wherein the envelope is smaller than the second portion and is secured directly to the second portion.

12. The assembly of claim 1, further comprising a message portion removably attached to the envelope, the message portion constructed and arranged to receive handwriting and be removed from the envelope and placed in the pocket.

13. The assembly of claim 1, wherein the first transaction card is attached to the envelope so that the machine readable feature is accessible for reading at a point-of-sale for purposes of activating the first transaction card.

14. The assembly of claim 13, wherein the machine readable feature is formed on a side of the first transaction card that is removably attached to the envelope.

15. A transaction card and envelope assembly comprising:
a transaction card assembly having at least one transaction card removably attached to a second portion, the at least one transaction card having a first machine readable feature that is useable in a transaction involving the transaction card, the first machine readable feature including information representing an account associated with the transaction card; and
an envelope having a pocket and an outer surface that is exposed when the envelope is closed, the envelope being constructed and arranged to receive at least a portion of the transaction card in the pocket and to be closed with the portion of the transaction card in the pocket;
wherein the transaction card assembly is removably attached to the envelope , and the pocket of the envelope has a size that is smaller than a size of the transaction card assembly.

16. The assembly of claim 15, wherein the transaction card assembly is removably attached to the outer surface of the envelope.

17. The assembly of claim 15, wherein the envelope includes a flap that is movable between an open position to expose the pocket for access and a closed position to close the pocket.

18. The assembly of claim 17, wherein the flap includes a hole and is constructed and arranged to support the envelope and attached transaction card assembly from a hanger that engages with the hole.

19. The assembly of claim 18, wherein the flap is constructed and arranged to support the envelope and attached transaction card assembly in the open position.

20. The assembly of claim 15, wherein the pocket of the envelope is fully formed and ready for reception of a portion of the transaction card without requiring folding or other formation of the envelope.

21. The assembly of claim 15, wherein the envelope is constructed and arranged to support the attached at least transaction card from a hanger that engages with the envelope.

22. The assembly of claim 21, wherein the envelope includes a hole that is constructed and arranged to engage with the hanger.

23. The assembly of claim 15, wherein the transaction card and the second portion are formed from a same sheet of material and are separable via a line of weakness formed in the sheet of material.

24. The assembly of claim 15, wherein the pocket has a size that is suitable to receive the transaction card alone, but is too small to receive the transaction card when attached to the second portion.

25. The assembly of claim 24, wherein the envelope is smaller than the second portion and is secured directly to the second portion.

26. The assembly of claim 15, further comprising a message portion removably attached to the envelope, the message portion constructed and arranged to receive handwriting and be removed from the envelope and placed in the pocket.

27. The assembly of claim 15, wherein the transaction card is attached to the envelope so that the machine readable feature is accessible for reading at a point-of-sale for purposes of activating the transaction card.

28. The assembly of claim 27, wherein the machine readable feature is formed on a side of the transaction card that is removably attached to the envelope.

29. A transaction card and envelope assembly comprising:
a transaction card assembly having at least one transaction card removably attached to a second portion, the at least one transaction card having a first machine readable feature that is useable in a transaction involving the transaction card, the first machine readable feature including information representing an account associated with the transaction card;
an envelope having a pocket and an outer surface that is exposed when the envelope is closed, the envelope being constructed and arranged to receive at least a portion of the transaction card in the pocket and to be closed with the portion of the transaction card in the pocket; and
a message portion removably attached to the envelope, the message portion constructed and arranged to be removed from the envelope and placed in the pocket.

30. The assembly of claim 29, wherein the message portion is attached to the envelope near an entrance to the pocket and is removable from the envelope via a perforation.

31. The assembly of claim 29, wherein the message portion and the transaction card are formed from a same sheet of material and are separable from each other via a line of weakness formed in the sheet of material.

32. The assembly of claim 29, wherein the transaction card assembly is removably attached to the outer surface of the envelope.

33. The assembly of claim 29, wherein the envelope includes a flap that is movable between an open position to expose the pocket for access and a closed position to close the pocket.

34. The assembly of claim 33, wherein the flap includes a hole and is constructed and arranged to support the envelope and attached transaction card assembly from a hanger that engages with the hole.

35. The assembly of claim 33, wherein the flap is constructed and arranged to support the envelope and attached transaction card assembly in the open position.

36. The assembly of claim 29, wherein the pocket of the envelope is fully formed and ready for reception of a portion of the transaction card without requiring folding or other formation of the envelope.

37. The assembly of claim 29, wherein the envelope is constructed and arranged to support the attached at least transaction card from a hanger that engages with the envelope.

38. The assembly of claim 37, wherein the envelope includes a hole that is constructed and arranged to engage with the hanger.

39. The assembly of claim 29, wherein the transaction card and the second portion are formed from a same sheet of material and are separable via a line of weakness formed in the sheet of material.

40. The assembly of claim 29, wherein the pocket has a size that is suitable to receive the transaction card alone, but is too small to receive the transaction card when attached to the second portion.

41. The assembly of claim 40, wherein the envelope is smaller than the second portion and is secured directly to the second portion.

42. The assembly of claim 29, wherein the transaction card is attached to the envelope so that the machine readable feature is accessible for reading at a point-of-sale for purposes of activating the transaction card.

43. The assembly of claim 42, wherein the machine readable feature is formed on a side of the transaction card that is removably attached to the envelope.

44. The assembly of claim 29, wherein the transaction card is a gift card, a prepaid phone card, or a pre-paid credit card.

* * * * *